Jan. 30, 1934. F. MADRAK 1,945,446
FISHING TACKLE ACCESSORY UNIT
Filed May 26, 1932
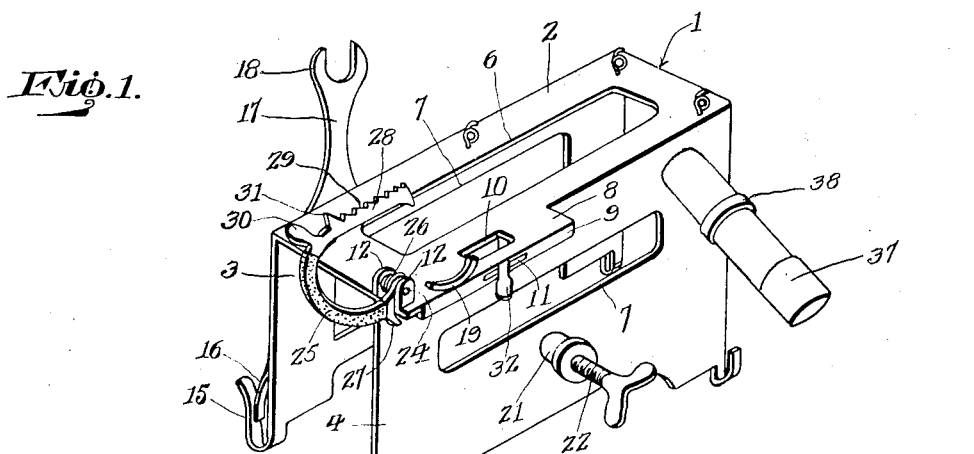
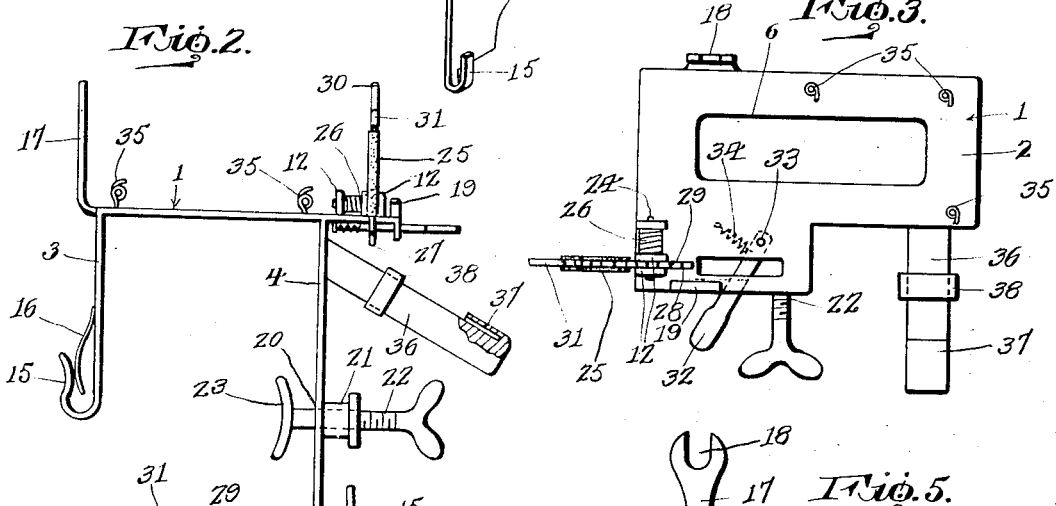
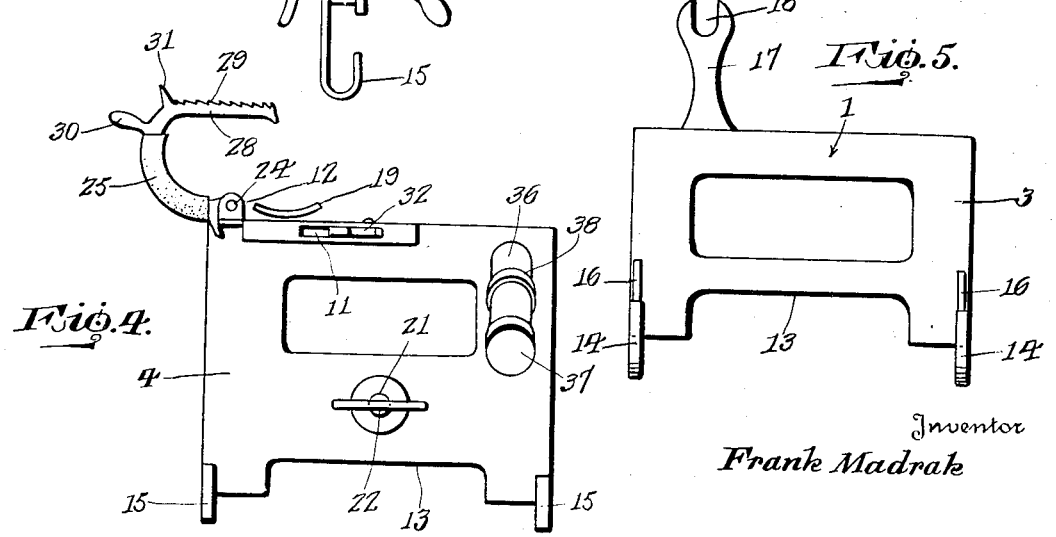
Inventor
Frank Madrak
By Geo. P. Kimmel
Attorney Patented Jan. 30, 1934

1,945,446

UNITED STATES PATENT OFFICE 1,945,446

FISHING TACKLE ACCESSORY UNIT

Frank Madrak, Duryea, Pa.

Application May 26, 1932. Serial No. 613,719

10 Claims. (Cl. 248—37)

This invention relates to a fishing tackle accessory unit, and has for its object to provide, in a manner as hereinafter set forth, a unit of the class referred to including a holder capable of being releasably clamped in fixed position to any desirable support, such as the side of a boat and including means for detachably clamping therewith a fishing rod and line reel in spaced relation, and further including combined line holders and guides for a fishing line leading from the reel to the rod thereby overcoming the necessity of the fisherman holding the rod and continued attention to the line.

A further object of the invention is to provide, in a manner as hereinafter set forth, a fishing tackle accessory unit including a holder capable of being releasably clamped in fixed straddling relation to any suitable support, such as the side of a boat and including at one side thereof hanger means for containers for bait and at the other side thereof hanger means for containers for live bait and fish that have been caught.

Further objects of the invention are to provide, in a manner as hereinafter set forth, a fishing tackle accessory unit which is simple in its construction and arrangement, strong, durable, compact, thoroughly efficient for the purpose intended, and comparatively inexpensive to manufacture.

To the above ends essentially, and to others which may hereinafter appear, the invention consists of such parts, and such combination of parts which fall within the scope of the invention as claimed.

In the drawing:

Figure 1 is a perspective view of a fishing tackle accessory unit in accordance with this invention.

Figure 2 is an end view of the unit.

Figure 3 is a top plan.

Figure 4 is an elevation looking towards one side of the unit.

Figure 5 is a view similar to Figure 4 looking towards the other side of the unit.

The unit includes a holder element 1 formed of a rectangular top 2 and a pair of rectangular sides 3, 4. The top 2 has a rectangular lengthwise slot 6. Each side has a rectangular slot 7. The slots 6, 7 are provided to reduce the weight of the element. The element 1 is of inverted U-shape.

The sides are flush with the top and the latter is formed with a lateral extension consisting of a rectangular plate 8 and a vertically disposed flange 9, the latter being at the outer side edge and of less length than that of the plate. The extension is of less length than and is flush at its outer end with one end of top 2. The plate 8 and flange 9 are slotted, as at 10, 11 respectively.

Formed integral with the plate 8 at its outer end is a set of three upstanding spaced, parallel apertured lugs 12. The bottom of each side is cutout, intermediate its ends as at 13. The bottom of side 3, at each end thereof is formed with extended portions 14 of hook-like form providing hanger means for containers for live bait or for the fish caught. The bottom of side 4, at each end thereof is formed with extended portions 15 of hook-like form providing hanger means for containers for bait. Secured to the side 3 and depending into portions 14 are resilient latching members 16 for releasably retaining the containers in the portions 14.

Formed integral with that side of top 2 opposite the side formed with the plate 8 is an upstanding fishing pole support 17 having a bifurcated upper end 18. Secured to the plate 8 and aligning with the bottom of the support 17 is a curved fishing pole seat 19.

The side 4 has an opening 20 and registering therewith is an internally threaded sleeve 21 which is integral with the outer face of and disposed laterally with respect to side 4. Threadedly engaging with the sleeve 21 and extending through opening 20 is an adjustable clamping bar 22 provided on its inner end with an abutment head 23. The element 1 is to be arranged to straddle a support, such as the side of a boat. The clamping bar is then adjusted in the desired direction to bind side 3 against the outer face of the side of the boat whereby element 1 is detachably clamped in position.

Mounted in the lugs 12 is a pivot 24 upon which is mounted the lower end of a curved clamping arm 25 for the fishing rod, when the latter is mounted in support 17 and upon seat 19. The arm 25 is covered with any suitable material to prevent it from marring the periphery of the rod at the handle portion of the rod. A controlling spring for arm 25 is indicated at 26 and which is fixed at one end to arm 25 and at its other end to a lug 12. The spring 26 is mounted on pivot 24. The lower end of arm 25 has a stop 27 engageable with an end of plate 8 to arrest the outward shift of arm 25, the latter at its upper end merges into an extension 28 having a lengthwise edge thereof provided with teeth, as at 29, a handle piece as at 30 and a stop as at 31 between the teeth 29 and handle piece 30. The stop 31 limits the inward shift of arm 25. The latter is mounted between a pair of lugs 12.

When the arm 25 is moved to clamping position with respect to the fishing rod, the extension 28 passes downwardly through slot 10.

Associated with the teeth of the extension 28 is a spring controlled latching means for arm 25. The said means includes a latching member 32 arranged below and having its inner end pivoted as at 33 to plate 8. A controlling spring 34 is provided for member 32, the latter extends outwardly through slot 11, is disposed at an inclination with respect to flange 9 and arranged in the path of extension 28.

Secured to the upper face of top 2 are spaced combined line guide and holders 35. Extended from side 4 is a cylindrical reel support 36 provided with a socket 37 and a shiftable clamping band 38, the latter and socket 37 coact to detachably clamp a reel, not shown, upon support 36, the latter inclines downwardly from side 4.

The fishing line, not shown, leads from the reel, not shown, on support 36, through the combined line guide and holders 35 to the rod, not shown, clamped in the support 17 and upon seat 19.

What I claim is:—

1. In a fishing tackle accessory unit, a holder element of inverted U-shape adapted to straddle a support and having means at one side thereof for clamping it stationary to such support, a member extending upwardly from one side of the top of said element and having a forked upper end for supporting a fishing pole at a point adjacent the handle of the latter, a seat on the other side of the top of said element for the handle for the fishing pole and arranged below the upper end of said member, a shiftable spring controlled pole overlapping arm arranged inwardly of said seat, pivotally connected at one end to and adapted to have its other end extend through said top for clamping said handle against said seat to maintain in connection with said member the pole at an upward inclination from said seat, and a spring controlled latch carried by said top for said arm.

2. In a fishing tackle accessory unit, a holder element of inverted U-shape adapted to straddle a support and having means at one side thereof for clamping it stationary to such support, a member extending upwardly from one side of the top of said element and having a forked upper end for supporting a fishing pole at a point adjacent the handle of the latter, a seat on the other side of the top of said element for the handle for the fishing pole and arranged below the upper end of said member, a shiftable spring controlled pole overlapping arm arranged inwardly of said seat, pivotally connected at one end to and adapted to have its other end extend through said top for clamping said handle against said seat to maintain in connection with said member the pole at an upward inclination from said seat, and a spring controlled latch carried by said top for said arm, said arm being provided with spaced stops for limiting its shifting movement in opposite directions and with teeth selectively engageable by said latch.

3. In a fishing tackle accessory unit, a holder element of inverted U-shape adapted to straddle a support and having means at one side thereof for clamping it stationary to such support, a member extending upwardly from one side of the top of said element and having a forked upper end for supporting a fishing pole at a point adjacent the handle of the latter, a seat on the other side of the top of said element for the handle for the fishing pole and arranged below the upper end of said member, a shiftable spring controlled pole overlapping arm arranged inwardly of said seat, pivotally connected at one end to and adapted to have its other end extend through said top for clamping said handle against said seat to maintain in connection with said member the pole at an upward inclination from said seat, a spring controlled latch carried by said top for said arm, said arm being provided with spaced stops for limiting its shifting movement in opposite directions and with teeth selectively engageable by said latch, and said arm being formed with a handle between said stops.

4. In a fishing tackle accessory unit, a holder element of inverted U-shape adapted to straddle a support and having means at one side thereof for clamping it stationary to such support, a member extending upwardly from one side of the top of said element and having a forked upper end for supporting a fishing pole at a point adjacent the handle of the latter, a seat on the other side of the top of said element for the handle for the fishing pole and arranged below the upper end of said member, a shiftable spring controlled pole overlapping arm arranged inwardly of said seat, pivotally connected at one end to and adapted to have its other end extend through said top for clamping said handle against said seat to maintain in connection with said member the pole at an upward inclination from said seat, a spring controlled latch carried by said top for said arm, and means arranged below the top of said element for supporting said latch, said latch being extended from its supporting means.

5. In a fishing tackle accessory unit, a holder element of inverted U-shape adapted to straddle a support and including means arranged below the top thereof for clamping it stationary to a support, spaced combined fishing line guide and holder devices extending upwardly from and arranged at the sides of said top, a fishing line reel support extended from one side of said element below one of said combined guide and holder devices, and means carried by said fishing line reel support for detachably clamping the reel on the latter.

6. In a fishing tackle accessory unit, a holder element of inverted U-shape adapted to straddle a support and including means arranged below the top thereof for clamping it stationary to a support, spaced combined fishing line guide and holder devices extending upwardly from and arranged at the sides of said top, a fishing line reel support extended from one side of said element below one of said combined guide and holder devices, means carried by said fishing line reel support for detachably clamping the reel on the latter, and said fishing line reel support being disposed downwardly at an inclination from that side of said element from which it extends.

7. In a fishing tackle accessory unit, a holder element of inverted U-shape adapted to straddle a support and including means below the top thereof for clamping it stationary to said support, said element including a lateral extension projecting from one side of the top thereof, said extension being of angle-shape in transverse section and slotted in its top and in its side, a member extending upwardly from the other side of the top of said element and arranged opposite said lateral extension, said member being formed with a forked upper end for supporting a fishing pole adjacent the handle of the latter, a fishing pole handle seat on and arranged outwardly with respect to the slot in the top of said lateral extension, a shiftable spring controlled pole overlapping arm pivotally connected at one end to and adapted to extend through the slot in the top of the lateral extension for clamping the fishing pole handle on said seat and to maintain, in connection with said member the pole at an upward inclination with respect to said seat, and a spring controlled latch pivotally attached to and slidably mounted in the slot in the side of the lateral extension for engagement with said arm to latch the latter in clamping position.

8. In a fishing tackle accessory, an upstanding holder element, said element including a lateral extension projecting from one side of the top thereof, said extension being of angle-shape in transverse section and slotted in its top and in its side, a member extending upwardly from the other side of the top of said element and arranged opposite said lateral extension, said member being formed with a forked upper end for supporting a fishing pole adjacent the handle of the latter, a fishing pole handle seat on and arranged outwardly with respect to the slot in the top of said lateral extension, a shiftable spring controlled pole overlapping arm pivotally connected at one end to and adapted to extend through the slot in the top of the lateral extension for clamping the fishing pole handle on said seat and to maintain, in connection with said member the pole at an upward inclination with respect to said seat, and a spring controlled latch pivotally attached to and slidably mounted in the slot in the side of the lateral extension for engagement with said arm to latch the latter in clamping position.

9. In a fishing tackle accessory unit, a holder element of inverted U-shape adapted to straddle a support and including means adjacent the top thereof for clamping it stationary to said support, a fishing line reel support extended from one of the sides of said element in proximity to the top of the latter and disposed at a downward inclination from such side, and means carried by said support for detachably clamping a fishing reel thereon.

10. In a structure for supporting a fishing line reel and a fishing pole and for guiding a fishing line from the reel to the pole, a holder element, means carried by the latter adjacent one end thereof for supporting and clamping the pole over the top of said element transversely of the latter and at an upward inclination with respect to said top, a fishing line reel support extended from one side of said element below the top of the latter adjacent the other end of the element, and spaced combined fishing line guide and holder devices for interposition between the reel and pole, said devices being extended upwardly from the top of said element for guiding and retaining a stretch of the line upon said top and one arranged directly above said support.

FRANK MADRAK.